(12) United States Patent
Oowada

(10) Patent No.: US 9,043,165 B2
(45) Date of Patent: May 26, 2015

(54) ABNORMALITY DETERMINATION APPARATUS FOR ANGLE DETECTION DEVICE

(75) Inventor: Takahumi Oowada, Kariya (JP)

(73) Assignee: DENSO CORPORATION, Kariya (JP)

( * ) Notice: Subject to any disclaimer, the term of this patent is extended or adjusted under 35 U.S.C. 154(b) by 449 days.

(21) Appl. No.: 13/307,346

(22) Filed: Nov. 30, 2011

(65) Prior Publication Data

US 2012/0143520 A1 Jun. 7, 2012

(30) Foreign Application Priority Data

Dec. 1, 2010 (JP) ................. 2010-268414
Oct. 18, 2011 (JP) ................. 2011-228458

(51) Int. Cl.
*G01D 5/20* (2006.01)
*G01D 5/244* (2006.01)

(52) U.S. Cl.
CPC .......... *G01D 5/2073* (2013.01); *G01D 5/24461* (2013.01)

(58) Field of Classification Search
CPC ... G01D 5/2073; H02P 21/14; H02P 2203/03; H02P 2207/05; H02P 2209/11; H02P 25/023; H02P 25/026; H02P 27/04; H02P 6/16
USPC ............... 702/35; 318/400.37, 437, 700, 705, 318/719, 799, 809; 322/29
See application file for complete search history.

(56) References Cited

U.S. PATENT DOCUMENTS

| | | | |
|---|---|---|---|
| 3,858,109 A | * | 12/1974 | Liden ............................... 322/31 |
| 2003/0111974 A1 | | 6/2003 | Suzuki .......................... 318/661 |
| 2004/0010386 A1 | | 1/2004 | Kameya |
| 2004/0112148 A1 | | 6/2004 | Sakai et al. ............... 73/862.331 |

(Continued)

FOREIGN PATENT DOCUMENTS

| | | |
|---|---|---|
| JP | 09-115071 | 5/1997 |
| JP | 2000-039336 | 2/2000 |

(Continued)

OTHER PUBLICATIONS

Kaewpoonsuk et al., A Simple Amplitude Detector-Based Demodulator for Resolver Converters, Oct. 27-30, 2010, International Conference and Control, Automation and Systems, Gyeonggi-do, Korea, pp. 370-373.*

(Continued)

*Primary Examiner* — Toan Le
(74) *Attorney, Agent, or Firm* — Nixon & Vanderhye PC

(57) ABSTRACT

The abnormality determination apparatus, which is for determining presence of an abnormality in an angle detection device configured to output an output signal having a value equivalent to a rotational angle of a rotating body, includes a smoothing device configured to receive the output signal of the angle detection device to smooth a dependent variable of a function whose independent variable is the rotational angle equivalent value, and a parameter calculation device for calculating an abnormality determination parameter based on the dependent variable smoothed by the smoothing device. The function is such that an integrated value of the rotational angle equivalent value over a predetermined time section is always positive or negative, and is configured to vary the dependent variable continuously in accordance with continuous variation of the independent variable in at least a part of the predetermined time section.

12 Claims, 6 Drawing Sheets

(56) References Cited

U.S. PATENT DOCUMENTS

| | | | |
|---|---|---|---|
| 2006/0255794 A1* | 11/2006 | Lee | 324/207.17 |
| 2006/0288800 A1 | 12/2006 | Mukai et al. | 73/862.326 |
| 2008/0172202 A1 | 7/2008 | Nakazato | 702/151 |
| 2009/0206828 A1 | 8/2009 | Yamaura et al. | |
| 2009/0254295 A1 | 10/2009 | Kobayashi et al. | 702/95 |

FOREIGN PATENT DOCUMENTS

| | | |
|---|---|---|
| JP | 2004-045286 | 2/2004 |
| JP | 3758563 | 1/2006 |
| JP | 2007-010329 | 1/2007 |
| JP | 3938902 | 4/2007 |
| JP | 2008-164560 | 7/2008 |
| JP | 2009-192342 | 8/2009 |
| JP | 2009-250790 | 10/2009 |

OTHER PUBLICATIONS

Kim et al., A Study on the Fault Diagnosis Analysis of Variable Reluctance Resolver for Electric Vehicle, 2010 IEEE Sensors Conference, pp. 290-295.*

JP 2000-039336, Feb. 2000, English version, 13 pp.*

Office Action (3 pages) dated Jul. 1, 2014, issued in corresponding Japanese Patent Application No. 2011-228458 and English translation (4 pages).

Office Action (3 pages) dated Feb. 3, 2015, issued in corresponding Japanese Application No. 2011-228458 and English translation (4 pages).

* cited by examiner

ABNORMALITY DETERMINATION APPARATUS FOR ANGLE DETECTION DEVICE

This application claims priority to Japanese Patent Applications No. 2010-268414 filed on Dec. 1, 2010, and No. 2011-228458 filed on Oct. 18, 2011, the entire contents of which are hereby incorporated by reference.

BACKGROUND OF THE INVENTION

1. Field of the Invention

The present invention relates to an abnormality determination apparatus for determining an abnormality in an angle detection device configured to output a signal having a value varying periodically in synchronization with rotation of a rotating body.

2. Description of Related Art

Japanese Patent No. 3938902 discloses such an angle detection apparatus configured to detect its output gain based on the value of the output signal thereof divided by the value of a sine function or a cosine function whose phase is a current rotational angle of a rotating body.

However, if there is an abnormality in the angle detection device, and accordingly, the angle detection device cannot correctly detect its output gain, it is not possible to obtain correct information showing the current rotational angle of the rotating body.

SUMMARY

An exemplary embodiment provides an abnormality determination apparatus for determining presence of an abnormality in an angle detection device configured to output an output signal having a value equivalent to a rotational angle of a rotating body, the value periodically varying in synchronization with rotation of the rotating body, comprising:

a smoothing means configured to receive the output signal of the angle detection device to smooth a dependent variable of a function whose independent variable is the rotational angle equivalent value; and a parameter calculation means for calculating an abnormality determination parameter based on the dependent variable smoothed by the smoothing means, wherein the function is such that an integrated value of the rotational angle equivalent value over a predetermined time section is always positive or negative, and is configured to vary the dependent variable continuously in accordance with continuous variation of the independent variable in at least a part of the predetermined time section, the predetermined time section being defined by a set of values of the dependent variable used by the smoothing mean to smooth the dependent variable.

According to the exemplary embodiment, it becomes possible to reliably determine whether or not an angle detection device is operating correctly.

Other advantages and features of the invention will become apparent from the following description including the drawings and claims.

PREFERRED EMBODIMENTS OF THE INVENTION

First Embodiment

Figure 1:
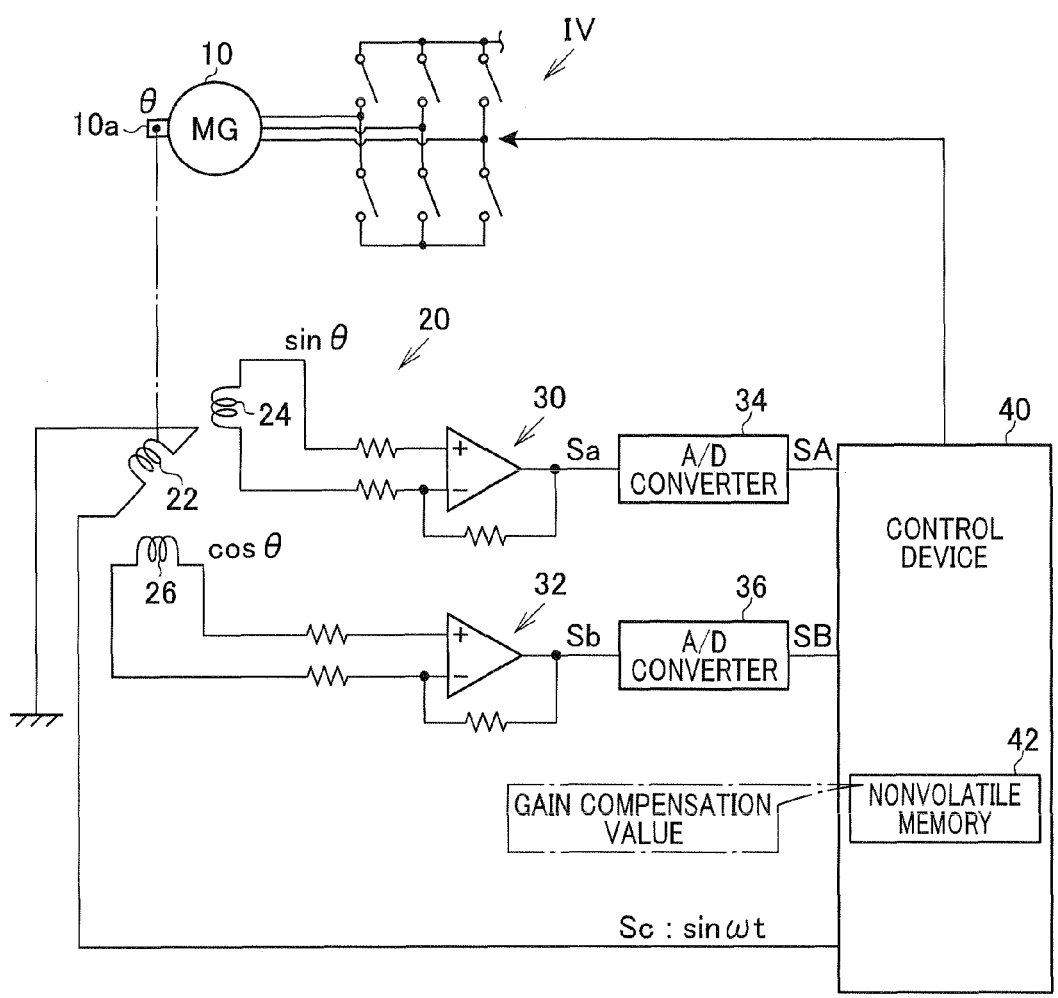
FIG. 1 is a diagram showing the structure of an abnormality determination apparatus for an angle detection device according to a first embodiment of the invention.

FIG. 1 is a diagram showing the structure of an abnormality determination apparatus for an angle detection apparatus according to a first embodiment of the invention.

In FIG. 1, the reference numeral 10 denotes a motor-generator mounted on a vehicle as a main engine. The motor generator 10 is mechanically coupled to the drive wheels of the vehicle. The reference character IV denotes an inverter for intermediating electrical power transmission between the motor-generator 10 and a battery (not shown). The motor-generator 10 is provided with a resolver 20 as an angle detection apparatus. A primary coil 22 of the resolver 20 is mechanically coupled to a rotor 10a of the motor-generator 10. The primary coil 20 is excited by a sinusoidal excitation signal Sc to generate flux. The flux generated in the primary coil 22 interlinks with a pair of secondary coils 24 and 26. The relative positional relationship between the primary coil 22 and the secondary coils 24 and 26 varies periodically in accordance with the electrical angle (rotational angle $\theta$) of the rotor 10a. Accordingly, the number of the flux lines varies periodically. In this embodiment, the secondary coils 24 and 26 are disposed with respect to the primary coil 22 such that the voltages generated in the secondary coils 24 and 26 shift from each other in phase by $\pi/2$. Accordingly, the output voltages of the secondary coils 24 and 26 make modulated wave signals which are amplitude-modulated versions of the excitation signal Sc modulated by modulation wave signals $\sin \theta$ and $\cos \theta$, respectively. More specifically, when the excitation signal Sc is represented as $\sin \omega t$, the modulated wave signals are represented as $\sin \theta \sin \omega t$ and $\cos \theta \sin \omega t$, respectively.

The output voltage of the secondary coil 24 is voltage-converted into an A-phase modulated wave signal Sa by a differential amplifier 30. The output voltage of the secondary coil 26 is voltage-converted into a B-phase modulated wave signal Sb by a differential amplifier 32. The A-phase modulated wave signals Sa and the B-phase modulated wave signal Sb are converted into digital data by A/D converters 34 and 36 as sampled signals SA and SB, respectively.

A control device 40 detects the rotational angle $\theta$ of the motor-generator 10 based on the rotational angle signal outputted from the resolver 20 (more exactly, based on the sampled signals SA and SB), and manipulates the inverter IV based on the detected rotational angle $\theta$ to control a controlled variable of the motor-generator 10.

There may occur an abnormality in which the A-phase modulated wave signal Sa or the B-phase modulated wave signal Sb deviates from its assumed or expected value. Such an abnormality is due to individual differences or age deterioration of the resolver 20, or the differential amplifier 30 or 32. Accordingly, the A-phase modulated wave signal Sa and the B-phase modulated wave signal Sb may deviate from the signals represented as K sin θ sin ωt or K cos θ sin ωt, K being the expected or assumed amplitude (gain). This lowers the accuracy of detection of the rotational angle θ.

Accordingly, in this embodiment, the actual gain K is detected and a gain compensation value is calculated based on the actual gain K used to compensate for the deviation for each of the A-phase modulated wave signal Sa and the B-phase modulated wave signal Sb. The gain compensation values are stored in a nonvolatile memory 42 within the control device 40. Hence, in this embodiment, the gains of the A-phase modulated wave signal Sa and the B-phase modulated wave signal Sb are corrected based on the gain compensation values to improve the accuracy of detection of the rotational angle θ. Incidentally, the nonvolatile memory is a memory capable of maintaining data written therein regardless of whether being supplied with power (voltage), such as an electrically rewritable read-only memory.

Next, the principle of detection of the gain K is explained by way of an example.

The A-phase modulated wave signal Sa oscillates at its amplitude center of zero, and has a periodicity. Accordingly, the average (the integrated value over one cycle) of the A-phase modulated wave signal Sa is nearly zero. However, for a dependent variable of an even function whose independent variable is the A-phase modulated wave signal Sa, the integrated value of the dependent variable over one cycle of the independent variable becomes a positive value. Further, since the dependent variable varies continuously in accordance with continuous variation of the independent variable, the integrated value of the even function is a function of the gain K. Here, when the even function is a quadric whose first-order term and zero-order term are zero, the dependent variable is given by the following expression (c1).

$$Sa^2 = (K\sin\omega t \sin\theta)^2 \quad\quad (c1)$$
$$= \frac{K^2}{4}(1 - \cos 2\omega t - \cos 2\theta + \cos 2\omega t \cos 2\theta)$$

The expression (c1) is a function of the gain K. The integrated values over N (N being a positive integer) cycles of the terms other than the first-order term of the expression (c1) become zero, because of the periodicity of the A-phase modulated wave signal Sa. Accordingly, the gain K can be detected with high degree of accuracy by calculating the integrated value over N cycles of the dependent variable. The error of the gain K decreases with the increase of the period of the integration, that is, with the increase of N.

Figure 2:
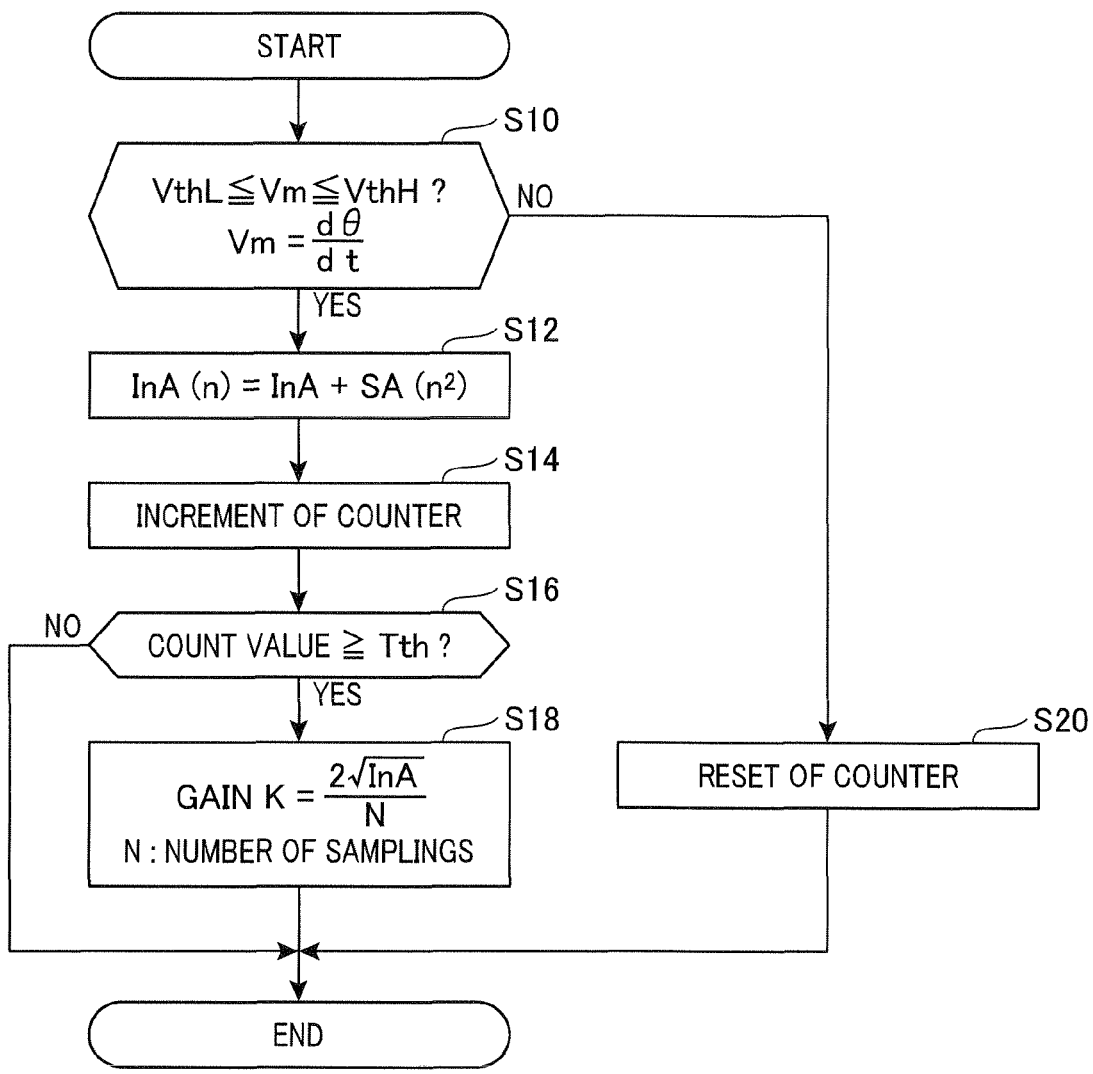
FIG. 2 is a flowchart showing a gain detection process performed by the abnormality determination apparatus according to the first embodiment of the invention.
Figure 4:
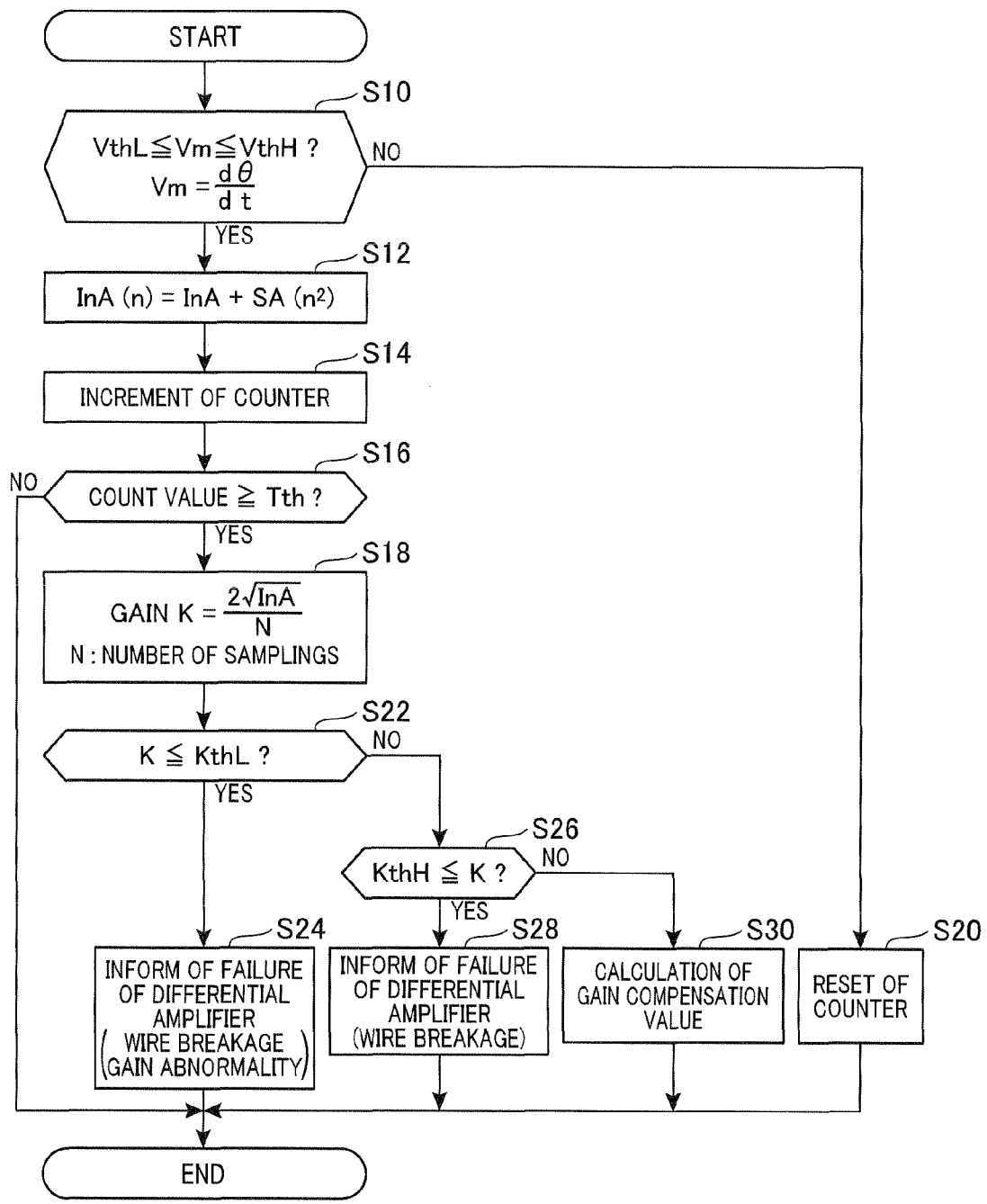
FIG. 4 is a flowchart showing a gain detection process performed by an abnormality determination apparatus according to a third embodiment of the invention.

FIG. 2 is a flowchart showing a gain detection process performed by the control apparatus 40. This process is performed by the control apparatus 40 at regular time intervals. The process shown in FIG. 4 is for detecting the gain K of the A-phase modulated wave signal Sa, however, the gain K of the B-phase modulated wave signal Sb can be detected by performing the same process. The expected value of the gain K of the A-phase modulated wave signal Sa is the same as that of the B-phase modulated wave signal Sb. However, since they may deviate differently from the expected value, they are detected independently.

This process begins in step S10 to determine whether or not the rotational speed Vm of the motor-generator 10 is higher than or equal to a low speed threshold VthL and lower than or equal to a high speed threshold VthH. Step S10 is for determining whether the gain K can be detected with a high degree of accuracy.

That is, if the rotational speed Vm is too low, it is difficult to sample the A-phase modulated wave signal Sa for a period over one cycle. Further, in this case, since the dependency of the integrated value of the square of the sampled signal SA on the rotational angle θ or the phase of the excitation signal Sc increases, the gain K cannot be detected accurately. Accordingly, in this embodiment, the low speed threshold VthL is set to a lower limit of a speed range within which the dependency of the integrated value over a later described sampling period Tth on the rotational angle θ and the excitation signal Sc is sufficiently small. The necessary low degree of the dependency is determined in accordance with a required accuracy of detection of the gain K.

On the other hand, if the rotational speed Vm is so high that the half cycle becomes nearly the same as the sampling period, it may occur that the signs of the terms of the expression (c1) which are dependent on the rotational angle θ become the same as one another in each sampling period, or the number of the terms which are positive in sign is significantly different from that of the terms which are negative in sign. In this case, it is difficult to make null the integrated values of the terms which are dependent on the rotational angle θ. Accordingly, in this embodiment, the high speed threshold VthH is set to an upper limit of a speed range within which the difference between the number of the terms which are positive in sign and that of the terms which are negative in sign is smaller than or equal to a specified value. In this embodiment, the specified value is determined in accordance with the required accuracy of detection of the gain K.

Incidentally, it is necessary that the half cycle of the excitation signal Sc is not close to the sampling period to make null the integrated values of the terms which are dependent on only the double of the angular velocity of the excitation signal Sc. Accordingly, it is preferable to set the sampling period such that the difference between the number of the terms which are dependent on only double of the angular velocity of the excitation signal Sc and positive in sign and the number of the terms which are dependent on only the double of the angular velocity of the excitation signal Sc and negative in sign is smaller than or equal to a specific value. In this embodiment, the specified value is determined in accordance with the required accuracy of detection of the gain K.

If the determination result in step S10 is affirmative, the process proceeds to step S12 to calculate the integrated value InA(n) of the square of the sampled signal SA. In subsequent step S14, a counter for counting the time during which the sampled signal SA is sampled is incremented. In subsequent step S16, it is determined whether or not the count value of this counter is larger than or equal to the sampling period Tth. The sampling period Tth is set to a time period sufficiently longer than the rotation cycle corresponding to the rotational speed Vm. In this embodiment, the value of the sampling period Tth is determined in accordance with the required accuracy of detection of the gain K.

If the determination result in step S16 is affirmative, the process proceeds to step S18 to calculate and detect the actual gain. In this embodiment, the gain K is set to a value equal to the quotient of dividing double of the square root of the integrated value InA by the number N of samplings in view of the expression (c1). The difference between the assumed or expected value of the gain K and the detected value of the gain K is stored in the nonvolatile memory 42 as a gain compensation value. If there is no difference between the assumed or expected value of the gain K and the detected value of the gain K, the gain compensation value is zero. In this case, no correction is made to the detected gain K.

If the determination result in step S10 is negative, the process proceeds to step S20 to reset the counter.

When step S18 or S20 is completed, or if the determination result in step S16 is negative, the process is terminated. After the gain K is detected and the gain compensation value is stored in the nonvolatile memory 42, the gain K may optionally not be detected again. However, since the resolver 20 and its related parts deteriorate with time, it is preferable to detect the gain K regularly to update the gain compensation value.

According to the above embodiment, the following advantages can be provided.

(1) The gain K is calculated and detected as an abnormality determination parameter based on the integrated value of the square of the sampled signal SA or SB.
This makes it possible to detect the gain K with a high degree of accuracy.

(2) The gain K is calculated and detected based on the integrated value InA when the rotational speed Vm is higher than or equal to the low speed threshold VthL. This makes it possible to reduce the dependency of the detected value of the gain K on the rotational angle θ and the phase of the excitation signal Sc.

(3) The gain K is calculated and detected based on the InA when the rotational speed Vm is lower than or equal to the high speed threshold VthH. This makes it possible to reduce the dependency of the detected value of the gain K on the rotational angle θ and the phase of the excitation signal Sc.

Second Embodiment

Next, a second embodiment of the invention is described with particular emphasis on the difference with the first embodiment.

In this embodiment, the gains of the A-phase and B-phase modulated wave signals Sa and Sb are detected based on low-pass filtered values of the absolute functions of the A-phase and B-phase modulated wave signals Sa and Sb.

Figure 3:
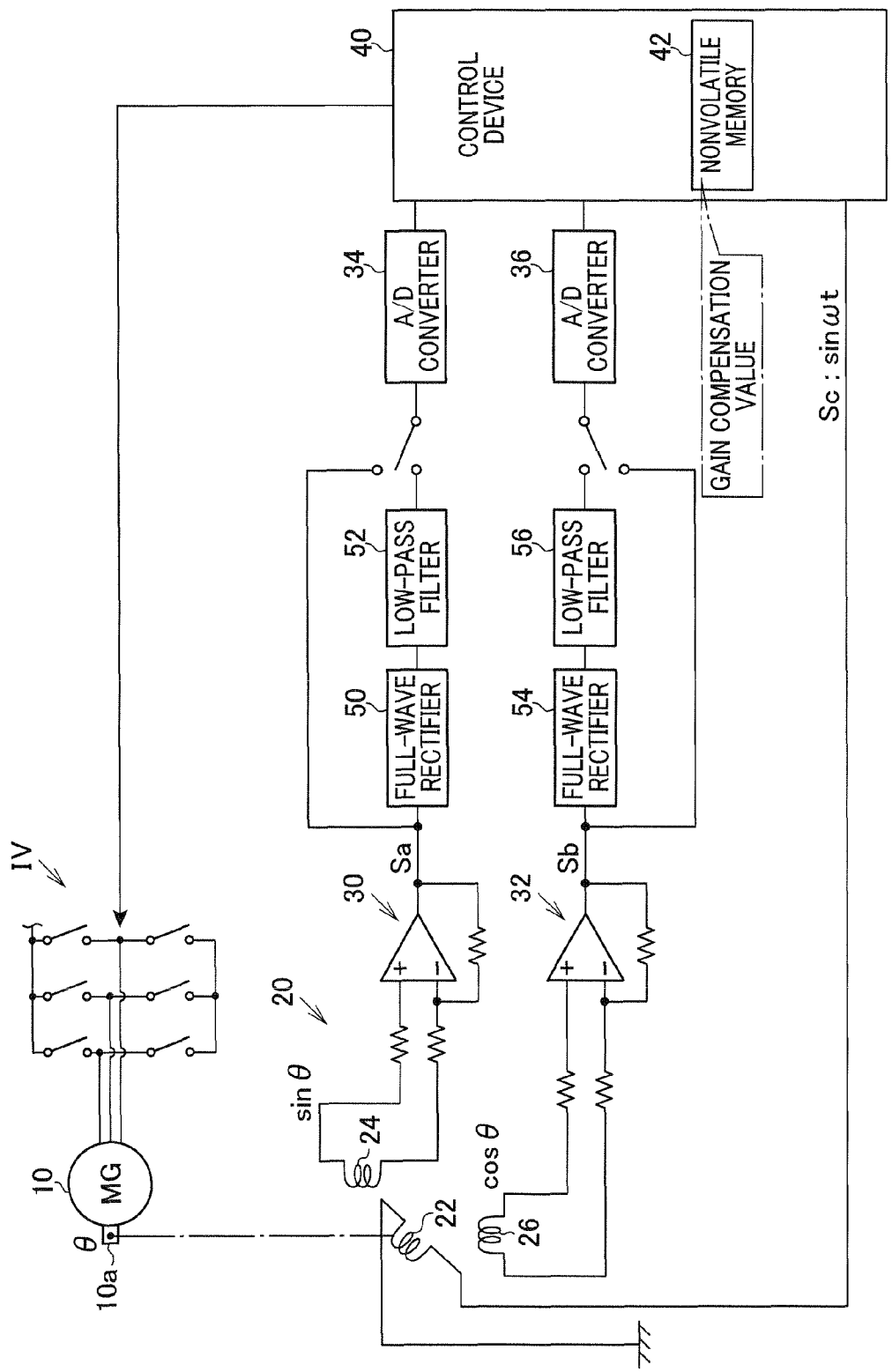
FIG. 3 is a diagram showing the structure of an abnormality determination apparatus for an angle detection device according to a second embodiment of the invention.

FIG. 3 is a diagram showing the structure of an abnormality determination apparatus according to the second embodiment of the invention. In FIG. 3, the same step numbers as those shown in FIG. 1 show the same steps.

As shown in FIG. 3, the A-phase modulated wave signal Sa is full-wave rectified by a full-wave rectifier 50. The output of the full-wave rectifier 50 is smoothed by a low-pass filter 52. The output of the low-pass filter 52 is supplied to the A/D converter 34 to detect the gain of the A-phase modulated wave signal Sa. Likewise, the B-phase modulated wave signal Sb is full-wave rectified by a full-wave rectifier 54. The output of the full-wave rectifier 54 is smoothed by a low-pass filter 56. The output of the low-pass filter 56 is supplied to the A/D converter 36 to detect the gain of the B-phase modulated wave signal Sb.

The values of the outputs of the low-pass filters 52 and 56 depend on the gains of the A-phase modulated signal and the B-phase modulated wave signal, respectively. This is because each of the integrated values of the A-phase modulated signal and the B-phase modulated wave signal is uniquely determined in accordance with the gain. Hence, the gains can be calculated and detected also in this embodiment. Further, according to this embodiment, since the calculations of the dependent variables of the even functions of the A-phase and B-phase modulated wave signals Sa and Sb, and the smoothing of the dependent variables are performed using the analog circuits, the computation load of the control device 40 can be reduced.

Third Embodiment

Next, a third embodiment of the invention is described with particular emphasis on the difference with the first embodiment.

In this embodiment, detection of failure (abnormality at a level to be informed to the user and to stop using the A-phase modulated wave signal Sa or the B-phase modulated wave signal Sb) of the differential amplifiers 30 and 32 and the resolver 20 is performed at the time of performing the gain detection process based on the detected gains (abnormality determination parameters).

FIG. 4 is a flowchart showing the gain detection process performed in this embodiment. This process is performed by the control apparatus 40 at regular time intervals before and also after the gains are detected. In FIG. 4, the same step numbers as those shown in FIG. 2 show the same steps.

In this process, after the gain K is calculated and detected in step S18, it is determined whether or not the detected gain K is smaller than or equal to a lower limit threshold KthL. In this embodiment, the lower limit threshold KthL is set to an upper limit of a gain range during which it is assumed that there is an abnormality that makes it impossible to continue the process for detecting the rotational angle θ by correcting the gain K based on the sampled signal SA. If the determination result in step S22 is affirmative, the process proceeds to step S24 to inform the outside that an abnormality has occurred causing excessive gain reduction or wire breakage in the differential amplifier 30.

If the determination result in step S22 is negative, the process proceeds to step S26 to determine whether or not the gain K is larger than or equal to an upper limit threshold KthH. In this embodiment, the upper limit threshold KthH is set to a lower limit of the gain range within which it is assumed there is abnormality that makes it impossible to continue the process for detecting the rotational angle θ by correcting the gain K based on the sampled signal SA. If the determination result in step S26 is affirmative, the process proceeds to step S28 to inform the outside that an abnormality has occurred causing excessive gain increase in the differential amplifier 30.

If the determination result in step S26 is negative, the process proceeds to step S30 to calculate the compensation value of the gain K and stores it in the nonvolatile memory 42.

Fourth Embodiment

Next, a fourth embodiment of the invention is described with particular emphasis on the difference with the first embodiment.

In the first embodiment, the gain compensation value is calculated based on the difference between the value of the detected gain K and the normal value (expected value) of the gain K. However, the first embodiment does not make a determination on whether or not the gain compensation value should be calculated. The fourth embodiment is configured to determine the degree of abnormality, to determine whether or not the gain compensation value should be calculated.

Figure 5:
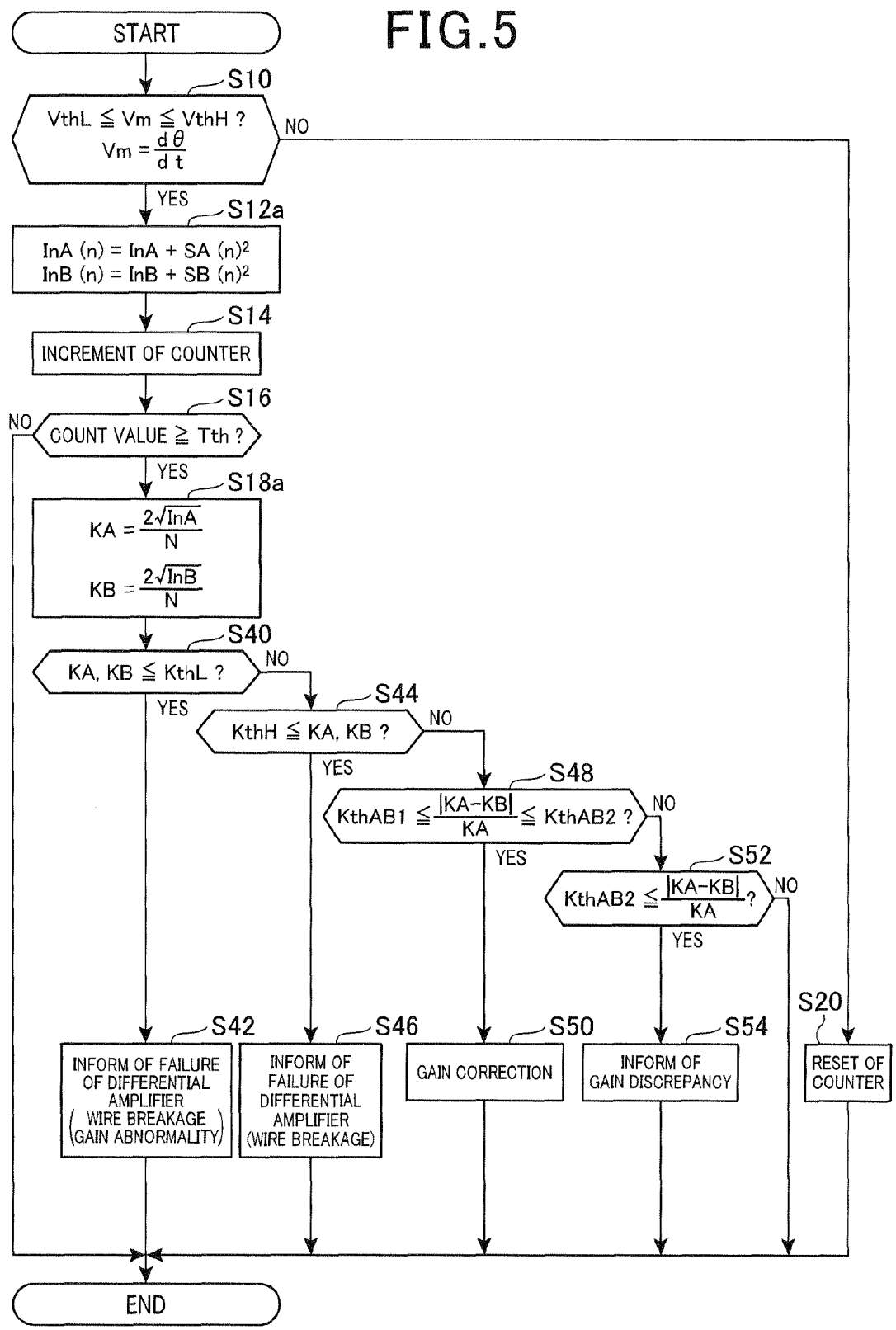
FIG. 5 is a flowchart showing a gain detection process performed by the abnormality determination apparatus according to a fourth embodiment of the invention.

FIG. 5 is a flowchart showing the gain detection process performed in this embodiment. This process is performed by the control apparatus 40 at regular time intervals. In FIG. 5, the same step numbers as those shown in FIG. 2 show the same steps.

In this embodiment, like in the first embodiment, if the determination result in step S10 is affirmative, the process proceeds to step S12a. In step S12a, the integrated value InA of the sampled signal SA and the integrated value InB of the sampled signal SB are calculated. Step S12a is performed repeatedly over the sampling period Tth by way of steps S14 and S16. When the sampling period Tth has elapsed, the process proceeds to step S18a to calculate and detect the gain KA of the A-phase modulated wave signal Sa and the gain KB of the B-phase modulated wave signal Sb.

Thereafter, steps S40 to S46 equivalent to steps S22 to S28 shown in FIG. 4 are performed for each of the gain KA and the gain KB. If it is determined that neither of the gain KA and gain KB is smaller than the lower limit threshold KthL, or larger than the upper limit threshold KthK, the process proceeds to step S48.

In step S48, it is determined whether or not the absolute value of the difference between the gain KA and the gain KB is larger than or equal to a first threshold KthAB1 and smaller than or equal to a second threshold KthAB2. Step S48 is for determining whether the gain compensation value should be calculated or not. The first threshold KthAB1 is set to a lower limit of a gain range within which it is desired to perform the gain correction by the gain compensation value to prevent the accuracy of detection of the rotational angle θ from being lowered. The second threshold KthAB2 is set to a lower limit of a gain range within which it is desired to inform the user of occurrence of an abnormality that needs stopping detection of the rotational angle θ based on the A-phase and B-phase modulated wave signals Sa and Sb. If the determination result in step S48 is affirmative, the process proceeds to step S50 to calculate the gain compensation value to enable reducing the difference between the gain of the A-phase modulated wave signal Sa and the gain of the B-phase modulated signal Sb, and more preferably equating them with each other. The gain compensation value may be calculated for only the A-phase modulated wave signal Sa to make the gain KA of the A-phase modulated wave signal Sa closer or equal to the gain KB of the B-phase modulated wave signal Sb. Conversely, the gain compensation value may be calculated for only the gain of the B-phase modulated wave signal Sb to make the gain KB of the B-phase modulated wave signal Sb closer or equal to the gain KA of the A-phase modulated wave signal Sa. The gain compensation value may be calculate for both the A-phase modulated wave signal Sa and the B-phase modulated signal Sb to make each of the gain KA and gain KB closer or equal to its expected value. Further, the gain compensation value may be calculate for both the A-phase modulated wave signal Sa and the B-phase modulated signal Sb to make each of the gain KA and gain KB closer or equal to its weighted average. The weighted average may be a simple arithmetic average in which weight coefficients are the same. Alternatively, the weighted average may be calculated using weighted coefficients set to larger values when the degree of the deviation is larger than when the degree of the deviation is smaller.

If the determination result in step S48 is negative, the process proceeds to step S52 to determine whether or not the absolute value of the difference between the gain KA and the gain KB is larger than or equal to the second threshold KthAB2. Step S52 is for determining whether or not the degree of the abnormality is so great that it is desired to inform the user of occurrence of an abnormality while stopping detection of the rotational angle θ based on the A-phase and B-phase modulated wave signals Sa and Sb. If the determination result in step S52 is affirmative, the process proceeds to step S54 to inform the user of occurrence of the abnormality.

Other Embodiments

The above embodiments may be modified as described below.

Regarding the smoothing means:

The smoothing means for smoothing the dependent variable may be performed using a digital low-pass filter without time-integrating the dependent variable.

The first embodiment may be provided with the low-pass filter used in the second embodiment. Conversely, the second embodiment may be modified to perform the integration of the dependent variable.

Regarding the function whose independent variable is the modulated wave signal:

The second embodiment may be modified to calculate the absolute function through a digital process.

The even function is not limited to a function whose dependent variable is the absolute value or square of the independent variable. For example, it may be a function whose dependent variable is the 2Nth (N≥2) power of the dependent variable.

Figure 6A:
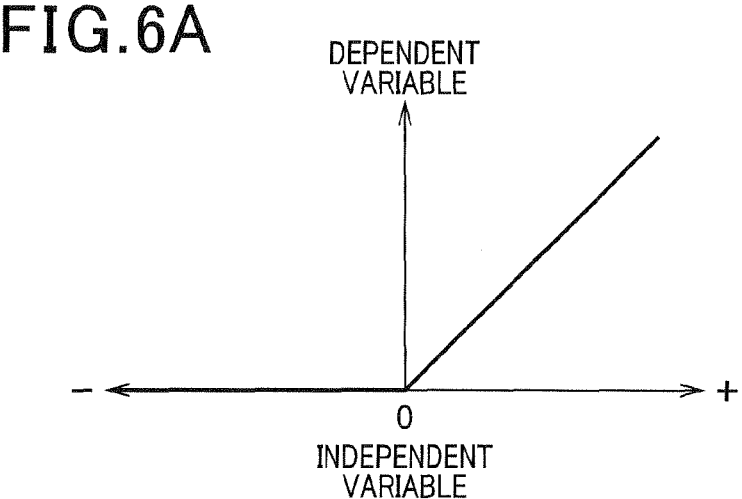
FIGS. 6A, 6B and 6C are diagrams showing functions used in modifications of the above embodiments.
Figure 6B:
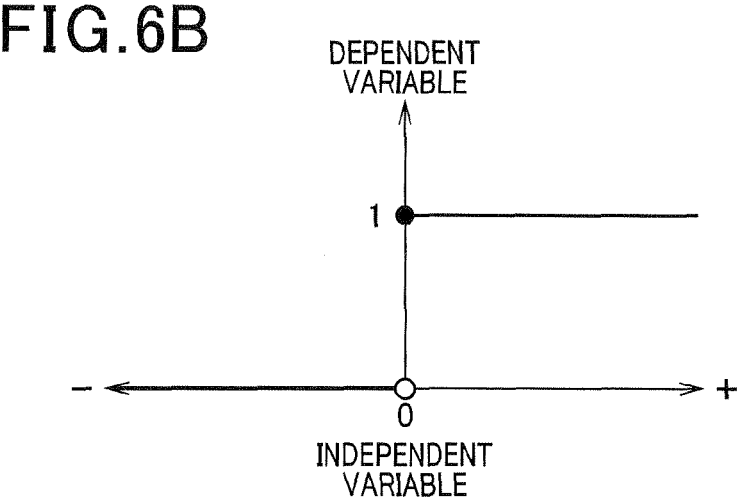

The even function may be replaced by any function if the integrated value of its output over one cycle of the modulated wave signal becomes always positive or negative. When the integrated value over one cycle is represented as In1, the integrated value over N cycles is represented as N×In1. The difference between the integrated value over N cycles and the integrated value between the Nth cycle and the (N+1)th cycle increases with the increase of N. Accordingly, the gain can be detected with a high degree of accuracy based on the integrated value over N cycles, or based on the difference between the integrated value over N cycles and the integrated value between the Nth cycle and the (N+1)th cycle if N is sufficiently large. Incidentally, as the function whose output being integrated over one cycle represents the gain, it is possible to use a function whose dependent variable is set to the value itself of the modulated wave signal when the modulated wave signal (independent variable) is positive, and set to zero when the modulated wave signal is negative, as shown in FIG. 6A. However, such a function whose independent variable is the modulated wave signal requires an area as a part of its domain, within which the dependent variable varies in accordance with variation of the independent variable. This is because, the integrated value does not contain information regarding the gain in the case of the function whose output is 1 when the dependent variable is positive and 0 when the dependent variable is zero or negative, for example, as shown in FIG. 6B.

Figure 6C:
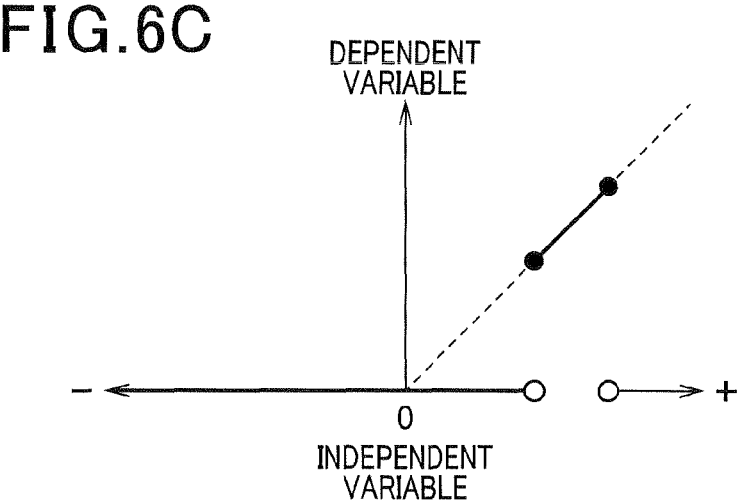

One of other examples that makes the integrated value of the modulated wave signal always positive or negative, and has an area as a part of its domain to continuously vary the dependent variable in accordance with variation of the independent variable is shown in FIG. 6C.

Incidentally, the function is not limited to the above described one that makes the integrated value of the modulated wave signal always positive or negative, and has an area as a part of its domain to continuously vary the dependent variable in accordance with variation of the independent variable. For example, the integrated value of the A-phase modulated wave signal Sa calculated for an area (section) in which the sign is positive is also a function of the gain. Accordingly, in step S12 shown in FIG. 1, the integrated value of the sampled signal SA may be calculated only for a section in which the sign of the sampled signal SA is positive to calculate the abnormality determination parameter of the gain K. This is also possible by using the function shown in FIG. 6A if the function is an identity transformation function. In this case, a section in which the sign is positive is identified by the phase of the excitation signal and the rotational angle θ, and the integrated value of the function for this identified section is calculated. In this case, however, since the accuracy of calculation of the rotational angle θ varies depending on the degree of abnormality quantified as the integrated value, the accuracy of detection may be lowered compared to the case of using the function shown in FIG. 6A. The lowering of the detection accuracy can be suppressed by repeating the process of calculating the rotational angle using the gain compensation value calculated based on the integrated value, and again calculating the integrated value based on this calculated rotational angle.

Regarding the rotational angle detection device:

The rotational angle detection device is not limited to the one configured to output the modulated wave signal generated by amplitude-modulating the carrier in accordance with the rotational angle of a rotating body. For example, it may be a device configured to modulate the phase of the carrier in accordance with the rotational angle of a rotating body as described, for example, in "Theory and Design Practice of AC Servo System" written by Sugimoto et al, and published by General Electronic Publishing Company. Also in this case, when the amplitude of the modulated wave signal deviates from the expected or assumed value, since the accuracy of detection of the phase of the modulated wave signal may be lowered, it is advantageous to detect the gain in the way described in the above embodiments.

Further, the rotational angle detection device may be a device that does not use a carrier, such as an eddy current type sensor. Also in this case, it is advantageous to detect the gain in the way described in the above embodiments, because its output signal has a value corresponding to the rotational angle parameter varying periodically in synchronization with rotation of a rotating body.

Regarding the inhibition means:

The inhibition means in not limited to the means for inhibiting the process of detecting the rotational angle θ based on the sampled signal Sa or Sb when the detected gain K is lower than the lower limit threshold KthL or higher than the higher threshold limit KthH. For example, the inhibition means may be configured to release the inhibition if a difference between the rotational angle detected based on the sampled signal Sa or Sb and the rotational angle detected by a conventional angle detector is within a predetermined value.

Regarding the determination parameter calculation means:

The means to directly detect the gain K may be omitted if the gain compensation value is calculated as $2/N \times \{(square root of integrated value InA) - expected gain \times N/2\}$.

The determination parameter calculation means may be provided for the purpose of calculating the input parameter of the inhibition means and not for the purpose of calculating the gain compensation value.

In the fourth embodiment, steps S40 to S46 may be omitted. Further, steps S52 and S54 may be omitted.
This is possible by using the calculated abnormality determination parameter only for calculating the gain compensation value, and determining, based on the determination result in step S48, whether or not the gain compensation value should be calculated. Incidentally, in the fourth embodiment, it is preferable to use a different method for quantifying an abnormality degree for the other abnormalities to be diagnosed. For example, the method to quantify the degree of difference between the gain of the A-phase modulated wave signal Sa and the gain of the B-phase modulated wave signal Sb is not limited to the one performed in step S48. It may be quantified as the ratio between the gain KA and the gain KB.

Even when steps S24 and S28 are performed in the third embodiment, or when steps S42 and S46 are performed in the fourth embodiment, the gain compensation value may be calculated based on the detected gain KA and gain KB to calculate the rotational angle θ, in order to suppress lowering of the accuracy of calculation of the rotational angle θ at a limp-home process after informing the user of occurrence of abnormality.

The above explained preferred embodiments are exemplary of the invention of the present application which is described solely by the claims appended below. It should be understood that modifications of the preferred embodiments may be made as would occur to one of skill in the art.

What is claimed is:

1. An abnormality determination apparatus for determining presence of an abnormality in an angle detection device configured to output a first modulated wave signal generated by modulating a carrier as an output signal having a value equivalent to a rotational angle of a rotating body, the value periodically varying in synchronization with rotation of the rotating body, comprising:
  a smoothing means configured to receive the first modulated wave signal from the angle detection device;
  a parameter calculation means for calculating an abnormality determination parameter of the angle detection device based on an output of the smoothing means, wherein:
  the smoothing means includes a function part and a smoothing part,
  the function part includes a function that receives, as an input thereof, only the first modulated wave signal,
  the function is an even function whose independent variable is the first modulated wave signal, and an integrated value of a dependent variable of the even function over one cycle of the independent variable is outputted as a converted signal having a positive value,
  the smoothing part is configured to smooth the converted signal,
  the function is such that an integrated value of the value equivalent to the rotational angle over a predetermined time section is positive or negative, and is configured to vary the output thereof continuously in accordance with continuous variation of the input thereof in at least a part of the predetermined time section, and
  the predetermined time section is defined by a set of values of the output of the function that are smoothed by the smoothing means.

2. The abnormality determination apparatus according to claim 1, wherein the function is such that an integrated value of the rotational angle equivalent value over one cycle is always positive or negative, and is configured to vary the dependent variable continuously in accordance with continuous variation of the independent variable in at least a part of a domain thereof.

3. The abnormality determination apparatus according to claim 2, further comprising a correction means for correcting the output signal of the angle detection device based on the abnormality determination parameter.

4. The abnormality determination apparatus according to claim 1, wherein the parameter calculation means is configured to calculate the abnormality determination parameter based on the smoothed dependent variable outputted from the smoothing means when a rotational speed of the rotating body is higher than or equal to a predetermined low speed threshold.

5. The abnormality determination apparatus according to claim 1, wherein the parameter calculation means is configured to calculate the abnormality determination parameter based on the smoothed dependent variable outputted from the smoothing means when a rotational speed of the rotating body is lower than or equal to a predetermined high speed threshold.

6. The abnormality determination apparatus according to claim 1, wherein the function is an even function.

7. The abnormality determination apparatus according to claim 6, wherein the dependent variable of the even function is an even numbered power of the independent variable.

8. The abnormality determination apparatus according to claim 6, wherein the dependent variable of the even function is an absolute value of the output signal outputted from the angle detection device.

9. The abnormality determination apparatus according to claim 1, wherein the smoothing means is a low-pass filter.

10. The abnormality determination apparatus according to claim 1, wherein the smoothing means includes a sampling means for sampling the output signal outputted from the angle detection device at discrete timings, and is configured to output an integrated value of the dependent variable of the function whose independent variable is the sampled output signal.

11. The abnormality determination apparatus according to claim 1 further comprising an inhibition means configured to inhibit the output signal outputted from the angle detection device from being used to determine the rotational angle of the rotating body when a gain of the output signal represented as the abnormality determination parameter is within a predetermined range.

12. The abnormality determination apparatus according to claim 1, wherein:
   the angle detection device outputs the first modulated wave signal and a second modulated wave signal generated by modulating the carrier as the output signal, and
   the smoothing means smoothes the dependent variable of the function of the first modulated wave signal, whose independent variable is the rotational angle equivalent value.

* * * * *